US007015428B2

(12) United States Patent
Kirkman

(10) Patent No.: US 7,015,428 B2
(45) Date of Patent: Mar. 21, 2006

(54) ELECTRICAL HEATER

(75) Inventor: Todd A. Kirkman, Chetek, WI (US)

(73) Assignee: Longview Research & Development, Chetek, WI (US)

( * ) Notice: Subject to any disclaimer, the term of this patent is extended or adjusted under 35 U.S.C. 154(b) by 0 days.

(21) Appl. No.: 10/807,523

(22) Filed: Mar. 23, 2004

(65) Prior Publication Data

US 2005/0211698 A1 Sep. 29, 2005

(51) Int. Cl.

| | |
|---|---|
| ***H05B 3/18*** | (2006.01) |
| ***H05B 3/36*** | (2006.01) |
| ***F16N 39/04*** | (2006.01) |
| ***F01M 5/02*** | (2006.01) |

(52) U.S. Cl. ...................... 219/438; 392/444; 219/535; 219/536; 219/549; 219/205; 123/142.5 E

(58) Field of Classification Search ................ 219/202, 219/205, 438, 436, 526, 528, 532, 544, 546, 219/548, 549; 392/441, 444, 448; 123/142.5 R, 123/142.5 E See application file for complete search history.

(56) References Cited

U.S. PATENT DOCUMENTS

| | | | | |
|---|---|---|---|---|
| 2,844,696 A * | 7/1958 | Custer, Jr. | .................... | 219/213 |
| 3,904,850 A * | 9/1975 | Johnson | ....................... | 219/528 |
| 4,468,557 A * | 8/1984 | Bylin et al. | ................. | 219/528 |
| 4,888,472 A * | 12/1989 | Stitz | ........................... | 219/548 |
| 5,017,758 A | 5/1991 | Kirkman et al. | ............ | 219/205 |
| 5,352,862 A * | 10/1994 | Barr | ........................... | 219/205 |
| 5,837,971 A * | 11/1998 | Lee | ............................ | 219/212 |
| 5,874,712 A * | 2/1999 | Toth et al. | .................. | 219/528 |

* cited by examiner

*Primary Examiner*—Joseph Pelham
(74) *Attorney, Agent, or Firm*—Jacobson & Johnson

(57) ABSTRACT

A heater formed of multiple layers with at least two envelope layers sealed to each other to form a closed envelope and with at least one of the layers within the sealed envelope layers comprising a gas permeable internal ground member that permit one to heat seal the envelope layers to each other and prevents destruction of the heater if the heater accidentally exceeds a critical operating temperature.

20 Claims, 3 Drawing Sheets

ELECTRICAL HEATER

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

FIELD OF THE INVENTION

This invention relates generally to electrical heaters and more specifically to a grounded encapsulated, electrical heater capable of resisting gasefication destruction.

BACKGROUND OF THE INVENTION

My U.S. Pat. No. 5,017,758 discloses a contact heater for attachment directly to a fluid reservoir such as the oil pan or the like with the heater utilizing the housing and the fluid contained in the housing as a heat sink to keep the contact heater from overheating.

The present invention comprises an improvement to contact heaters that includes a method of making a contact heater wherein the heating element and an electrical ground member are encapsulated in an envelope to prevent inadvertent shock to the user.

One of the difficulties in making an electric contact heater and particularly a low profile, aftermarket, contact heater is the need to form a heater that has a high watt density and can rapidly conduct the heat to the housing of a fluid reservoir while at the same time providing a contact heater that is sufficiently compact so as not to interfere with the operation of the equipment that it is secured to. One such type of heater, which is shown and described in my U.S. Pat. No. 5,017,758, uses layers of electrically insulating material sandwiched around a heating element. The layers of material perform a dual function in that they protect one from directly contacting the heating element while at the same time they rapidly conduct heat from the heating element to a housing of a fluid reservoir which is to be heated so that fluid contained within the fluid reservoir can be heated to a proper temperature. The use of a foil ground member on the exterior of the heater provides an electrical ground as well as a heat conductor. In order to provide an electrical ground member on the opposite or exposed side of the heating element it is proposed to include a similar foil ground member on the heater. However, since the exposed side can come into contact with a person it is proposed that the ground member on the opposite side of the heating element be incorporated into the envelope layers sealing and protecting the heating element.

Although the materials used to envelope the heater are gas permeable, it has been found that the process of assembly can cause the materials forming the envelop to blister if the materials are vulcanized or otherwise heat sealed to each other when a ground member is incorporated into the envelope. In addition, once assembled abnormal operational conditions can also cause the heater to blister thereby rendering the heater unsuitable for use.

In the preferred embodiment the heater relies on the heat capacity of the reservoir that it is attached to the heater to form a heat sink that quickly and continually dissipates heat so that the heater does not overheat; however, the present invention is also suitable for other heaters that might exceed a temperature that causes the heater to overheat and breakdown, which is referred to as a critical temperature. The critical temperature or heater breakdown temperature is well above the conventional temperature operating range of the heater and is primarily determined by the materials surrounding the heating element. That is, while the heating element usually does not breakdown if the heater exceeds the critical temperature the materials forming the sealed envelope around the heating element can blister and cause failure of the heater.

It would be desirable to extend the critical temperature in an internal grounded heater so that an inadvertent overheating of an internal grounded heater would not result in destruction of the layers of material forming the heater. The present invention provides an internal grounded heater, and more specifically a double grounded heater, wherein both sides of the electrical heater have a ground member proximate thereto. The heater of the present invention can operate at an elevated temperature that would normally produce heater breakdown. In addition one can heat seal the envelope layers of the heater without causing destruction of the heater.

The prior art method of forming a contact heater utilizes layers or flexible sheets of an electrical insulator such as sheets of silicone which are sandwiched around a heating element. To prevent accidental electrical shock in the event of a heater failure an external ground members extends along at least one face of the layers of electrical insulation located on the heating element. This type of heater is referred to as a single grounded heater with external envelope ground since the ground element is not encapsulated in a sealed envelope.

In some applications it may be necessary to envelope and seal the heater within the envelope and at the same time extend an internal ground member along both sides of the electrical insulator to minimize any opportunity for accidental electrical shock to a person or persons proximate the heater. This type of heater is a double grounded heater with an internal ground since there are electrical ground members on both sides of the heating element with one of the ground members located in the sealed envelope surrounding the heating element. In another embodiment only an internal ground member within the sealed envelope is provided. This type of heater is a single grounded heater with an internal envelope ground since the only ground member is internal to the envelope surrounding the heating element.

Unfortunately, the extending of an internal electrical ground member along the heating element and then encapsulating the electrical ground member in the sealable envelope layers can result in difficulties in manufacture of the heater as well as premature failure of the heater. That is, the enveloping of the heater and ground member in a sealed envelope can cause blistering of the envelope during the heat sealing process. In addition, if the enveloping process did not produce blistering, if one inadvertently overheats the heater the layers of material can blister or bubbles therein thereby rendering the heater unusable. While envelope formation failure is an assembly process failure the operational failure occurrences do not usually incur unless the heater is not properly secured to a heat sink. It would be preferable if such heater failure due to accidental overheating could also be prevented even though normal operation precludes the heater from reaching a critical temperature where such a failure can occur.

The present invention provides an apparatus and method of making a self adhesive contact heater with a double ground and wherein the ground member in is in envelope in the heater is gas permeable to provide a heater that remains intact and operable even though the heater encounters a temporary overheated condition as well as allows one to heat seal the heater envelope without destroying the heater.

SUMMARY OF THE INVENTION

A heater formed of multiple layers with at least two envelope layers sealed to each other to form a closed envelope and with at least one of the layers within the sealed envelope layers comprising a gas permeable internal ground member that permit one to heat seal the envelope layers to each other and prevents destruction of the heater if the heater accidentally exceeds a critical operating temperature.

BRIEF DESCRIPTION OF THE DRAWINGS

FIG. 6 is a top view of a heater for securement to a vehicle or the like.

DESCRIPTION OF THE PREFERRED EMBODIMENT

Figure 1:
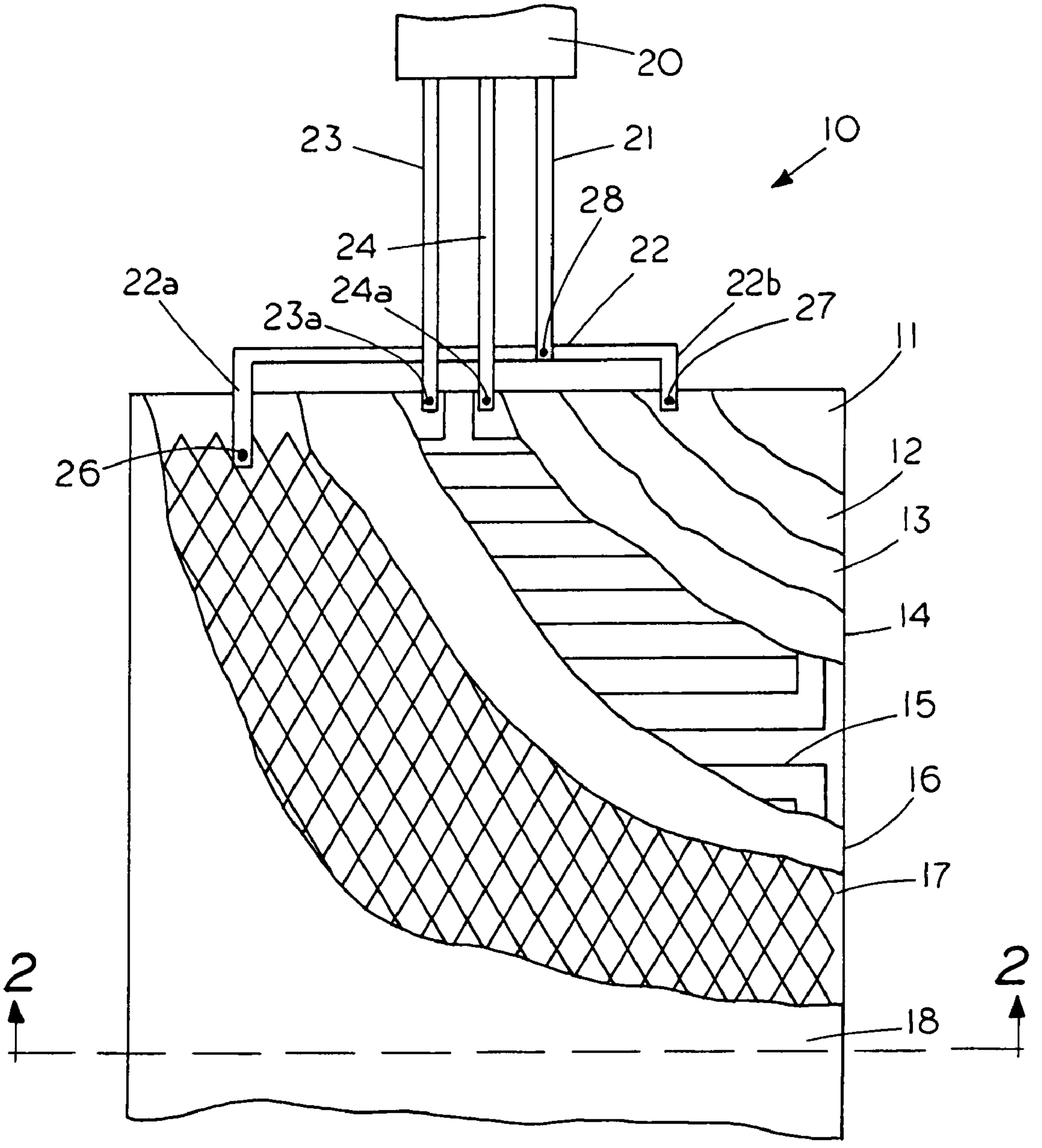
FIG. 1 is a cutaway view showing a portion of a contact heater of the present invention.

FIG. 1 shows a cutaway view of a contact heater 10 of the present invention comprising a plurality of flexible layers of a metal conductor and silicone electrical insulating layers that can be secured to a surface such as an exterior surface of a vehicle fluid reservoir so that the fluid retained therein can be heated through heat conduction from the contact heater.

The concept of heater that heats through conduction is more fully shown and described in my U.S. Pat. No. 5,017,758 which is hereby incorporated by reference.

FIG. 1 shows that contact heater 10 includes a first layer of a heat conducting adhesive 11 that enables the contact heater to be adhesively secured to an exterior surface of a fluid reservoir. The heat conducting adhesive layer 11 is secured to a flexible external electrical ground member 12 such as a metal foil or other electrically conducting material. Located adjacent to ground sheet 12 is a layer of flexible electrically insulating material 13. Secured to electrical insulating material 13 is a second layer of flexible electrical insulating material 14 that carries a flexible heating element 15. Heating element 15 can be formed from a grid of electrical heating wires or can be formed by securing a metal layer to carrier 14 and then etching away unwanted portions of the metal layer to create an integral one-piece electrical heating element that extends across the heater.

Located on the top side of heating element 15 is a further layer of flexible electrical insulating material 16 which cooperates with flexible electrical insulating material 14 to form an electrical insulation barrier around the heating element 15. Even though no thermostat need be used with the contact heater the operating watt density of such an electric heater can be in excess of 15 watts per square inch.

An electrical cord 20 for engagement with an electrical outlet includes a ground wire 21 and a pair of current conducting wires 23 and 24. Wire 23 is spot welded to one end of heating element 15 by a spot weld 23*a* and wire 24 is spot welded to the oppose end of heating element 15 by a spot weld 24*a*. Similarly, ground lead 21 is connected to a crossover lead 22 by a spot weld 28. One end of crossover ground lead 21 connects to mesh screen 17 by a spot weld 26 and the other end of crossover ground lead 22 connects to ground member 12 by a spot weld 27. Ground member 12 is a flexible metal foil such as aluminum foil or the like which can flex as well as provide an electrical ground member to prevent accidental shocks from a malfunctioning heater. While the drawings show a spot weld the connection between the electrical leads and the electrical ground member can be made in any of a number of ways including pressure contact.

Figure 6:
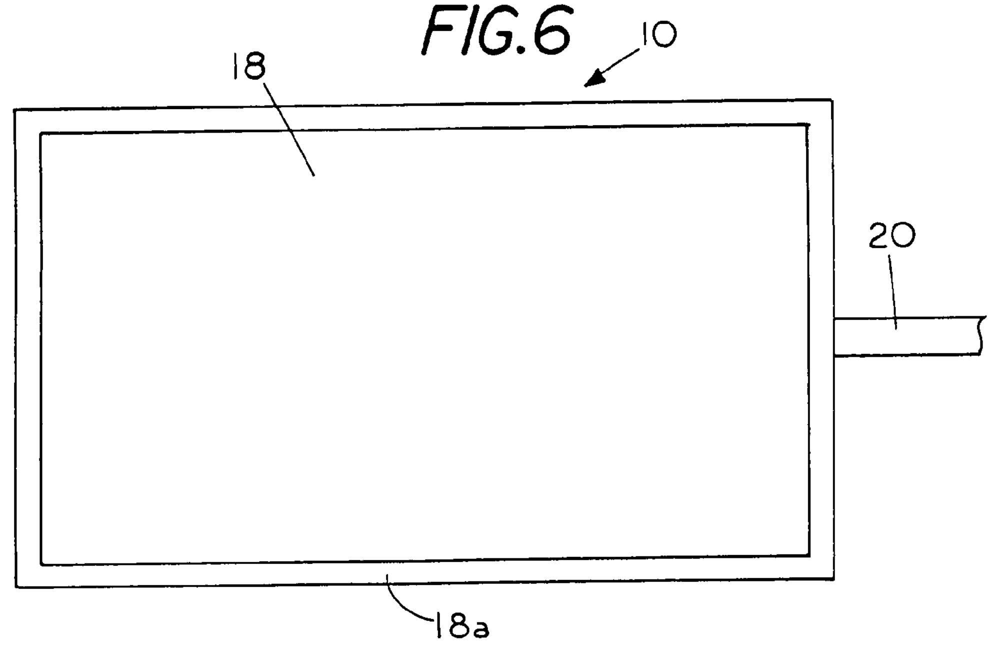

The present invention includes flexible electrical ground members on opposite sides of the heating element 15 to form an electrical ground envelope around the heating element to ensure that a heater failure will not cause shock to a user. The internal ground member 17 on the free or unattached side of the heating element 15 comprises a gas permeable member that permits gases generated within the heater to escape therethrough. By gas permeable member it is meant there are passages therein that can permit any gasses generated in the heating element or the electrical insulating layers to escape through the ground member 17 in the event that the heating element should be accidentally allowed to become overheated. That is, the typical electrical insulating layers 16 and 13 may emit gases when subject to high temperatures during manufacture or use. It has been found that such gasses are the most frequent causes of breakdown of the heater. If the gases are not allowed to escape blisters or bubbles can form in the electrical insulation layers thus destroying the integrity of the composite contact heater. In the present invention the outer layers 18 and 13 are heat sealed to each other to form an envelope or a sealed heater with an internal ground member. FIG. 6 is a top view of the heater 10 illustrating the peripheral sealing around heater 10 that encapsulate the heating element and at least one of the ground members.

I have found that use of a gas porous electrical ground member on the heater free side that is encapsulated in the heater envelope allows gases that are generated in an overheated condition to escape so the integrity the heater can be maintained even if the heater should accidentally become overheated for one reason or another. In the embodiment shown gas permeable electrical ground member 17 comprises a flexible mesh screen which permits gasses generated in the heater to escape through openings 17*a* In an alternate embodiment electrical ground member 17 can also be made from an electrically conducting foil with the foil including holes or gas passages therein to permit unwanted gases to escape and thus avoid blister or bubble damaging to the heater 15.

Figure 4:
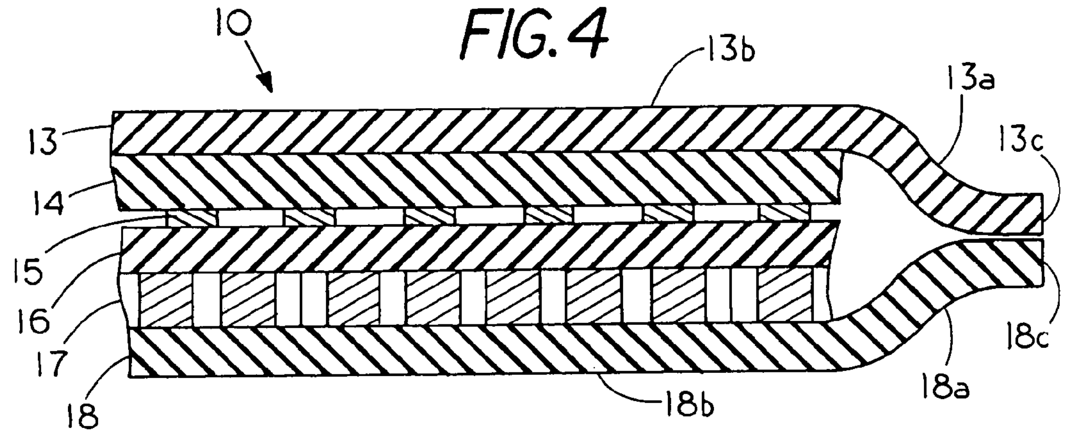
FIG. 4 shows a cutaway view of the heater prior to the sealing of the heater and an internal ground member in an envelope.

Located on the top of electrical ground sheet 17 is a layer of insulation material 18 that provides a protective cover or shield over the contact heater 10 to prevent any direct human contact with the electrical ground members. Preferably, the layers of insulation material are made from a commercially available silicone. One such commercially available silicone sheet is known as self extinguishing silicone rubber 51581RO15. The layers 18 and 13 are sealed to each other to form the heater as illustrated in FIG. 4.

The method of making the contact heater 10 includes adhering a layer of electrically conducting material 15 to a first side of an electrically insulating material such as electrical insulating layer of silicone 14 and then etching away portions of the electrically conducting material to create a resistance heating element 15 that extends along the layer of electrically insulating material 14.

A first layer of silicone 13 is placed on one side of silicone base 14 and a second layer of silicone 15 is placed on top of the heating element 15. These layers of silicone provide electrical insulation around the heating element.

In the next step gas permeable internal ground member 17 is placed on the layer of silicone 18 to provide an internal ground member for the heater.

A reference to FIG. 4 illustrates steps in the formation of the heater wherein the first layer of insulating materials such as silicone 13 is located on one side of silicone base 14 and a second layer of silicone 18 is placed over internal ground member 17. The envelope layers 13 and 18 are sufficiently large so as to extend beyond the edges of the other layers 14, 15, 16 and 17 to permit the lapping and heat sealing of the ends 13*c* and 18*c* to each other. This results in the exterior envelope layer 18 having a flat surface 18*b* over the area normal to the heating element 17, a beveled section 18*a* peripherally exterior to the heating element 17 with a laterally extending end 18*c* that extends peripherally around the heater. Similarly, exterior envelope layer 13 has a flat surface 13*b* over the area normal to the heating element 17, a beveled section 13*a* peripherally exterior to the heating elements 15 and positioned proximate the laterally extending end 18*c* that also extends peripherally around the heater.

Figure 5:
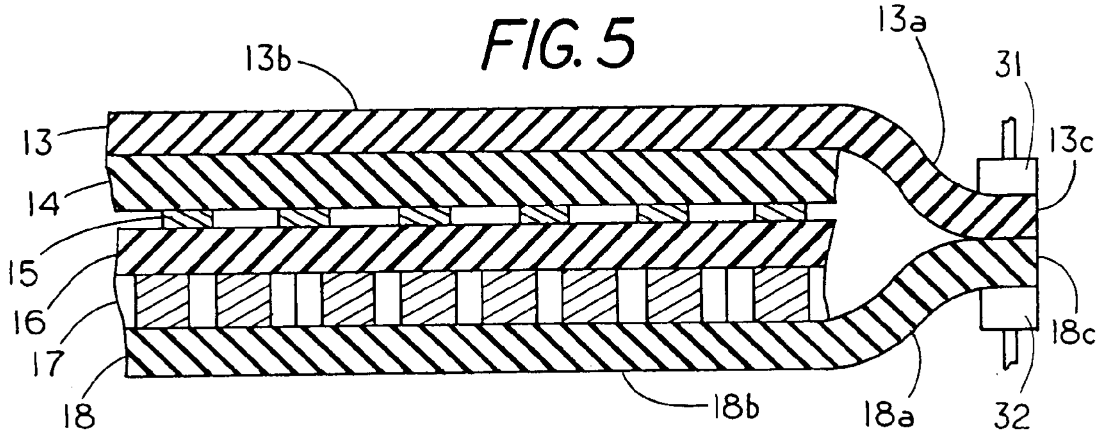
FIG. 5 shows the heater of FIG. 5 being heat sealed to form an envelope around the heating element and the internal ground member.

FIG. 5 shows the next step in the process wherein the silicone layer 13 and the silicone layer 18 are heat sealed to each other through a process of vulcanizing or the like to form a sealed envelope. Elements 31 and 32 are shown to illustrate the application of pressure and heat to form a sealed junction along the peripheral edges of the heater. Similarly, the entire assembly is subject to heat and pressure on surface 18*b* and 13*b* so as to seal the components to each other. The placement of a gas permeable ground member 17 allows gases from the elements within the heater to escape through the membrane 17 and through the envelope members 13 and 18.

Figure 2:
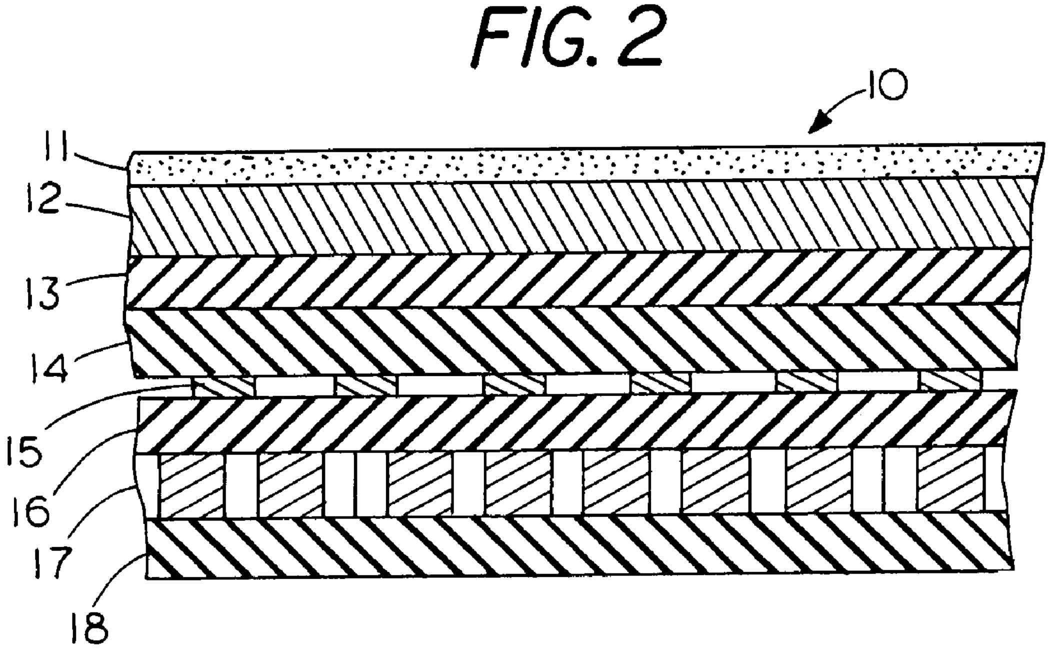
FIG. 2 is a cross sectional view of the contact heater of FIG. 1.

Once the heater is sealed to form the heater envelope the external ground member 12 and adhesive layer 11 are secured to the envelope as shown in FIG. 2.

Thus in the present invention one can then adhere a first electrical ground sheet 13 to a second side of the electrical insulation material 14 and adhere a second electrical ground sheet 17 having a plurality of gas passage therein to a carrier layer 16. One can then secure electrical grounds sheets 17 and 13 to the layers of electrical insulation layers 16 and 14 which are located around the layer of electrical conducting element 15 to create a low profile heater. By securing a set of electrical power leads 23 and 24 to the resistant heating element 15 and a ground wire 21 to each of the electrical ground sheets 17 and 13 one produce a double grounded contact heater that proves an electrical ground path for the heating element 15 in the event of failure of the heater 10 as well as prevents blistering or otherwise spoiling of the heater should the heater inadvertently overheat.

Figure 3:
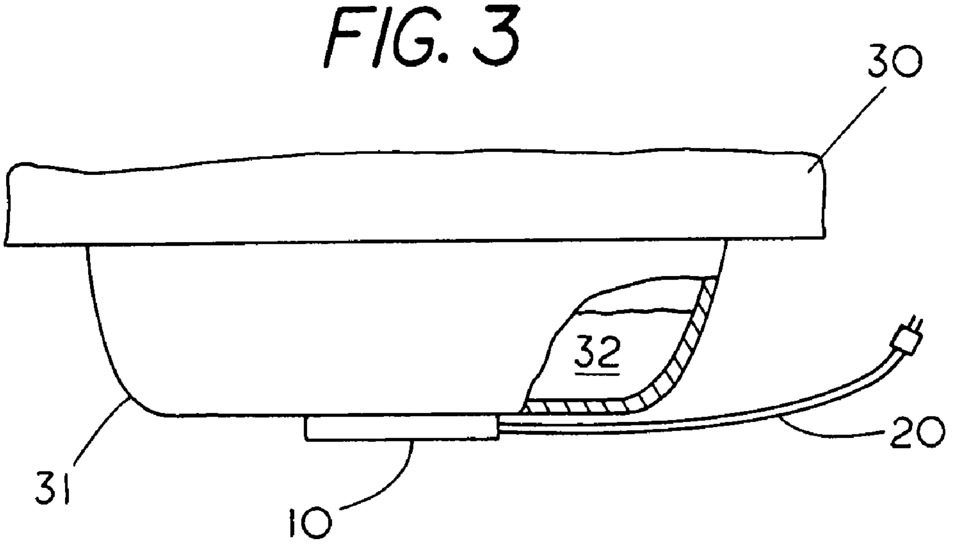
FIG. 3 is a partial sectional view of a vehicle with a fluid reservoir and a contact heater secured to the exterior surface of the contact heater.

FIG. 3 shows a portion of a vehicle 30 with a fluid reservoir 31 and a contact heater 10 secured to the exterior surface of the fluid reservoir 31. The cutaway of reservoir 31 revels a fluid 32 contained within the fluid reservoir which is to be heated by contact heater 10. Typical fluid reservoirs found on vehicles includes reservoirs for engine coolant, engine oil and hydraulic oil or even battery reservoirs.

Thus the embodiment of FIG. 3 comprises a temperature elevation system comprising a vehicle 30 having a fluid reservoir 31 and an electrical heater 10 secured to the fluid reservoir 31 to conduct heat from the electrical heater to the fluid reservoir with the heater including a first electrical ground member 13 located on one side of the electrical heating element 15 and a second internal electrical ground member 17 located on a free side of the electrical heating element 15 with the internal electrical ground member 15 located on the free side of the electrical heater having a plurality of gas passages 17*a* therein to permit escape of gas therethrough while providing an electrical ground path in the event of failure of the electrical heater.

Thus the present invention provides an envelope heater 10 capable of withstanding an overheating condition with the envelope heater includes a heating element 15 electrically isolated on each side by a layer of electrical insulating material with one of the layers of electrical insulating material 14 located on a conduction heat transfer side of the heater 10 and external to the heater envelope and the other layer of electrical insulating material 16 located on a free side of the heater; and an internal electrical ground member 17 located on the free side of the heater 10 and having a plurality of gas passages 17*a* therein to permit escape of gas therethrough while providing an internal electrical ground path in the event of failure of the electrical heater.

While the invention has been described with respect to preventing premature heater destruction due to accidentally overheating of a contact heater without a thermostat it can also be used in conjunction with a thermostat controlled heater that may also be subject to inadvertent overheating. In addition, in some instances only the heater free side may be covered with a gas porous electrical ground member and the conduction side may not have a ground member.

I claim:

1. A contact heater comprising a plurality of layers:

a first layer of a heat conducting adhesive;

a first electrical ground sheet extending along the heat conducting adhesive;

a first envelope layer;

a carrier layer extending along the heat conduction adhesive;

a heating element located on said carrier layer;

an electrically insulating layer extending along said heating element;

a second electrical ground sheet carried by said electrical insulating layer, said second electrical ground sheet having a plurality of openings therein to permit gas passage therethrough;

an electrically insulated layer comprising a second envelope layer extending over said second electrical ground sheet;

an electrical cord having a first power lead and a second power lead connected to said heating element and a ground wire electrically secured to said ground sheet and said second ground sheet to prevent accidental shock in the event of a heater failure; and said first envelope layer and said second envelope layer an envelope encapsulating said electrical insulating layers, said heating element and at least one of said electrical ground sheets.

2. The contact heater of claim 1 wherein the heating element has a power density is in excess of 15 watts per square inch.

3. The contact heater of claim 1 wherein the heating element is vulcanized to the carrier layer.

4. The contact heater of claim 1 wherein the carrier layer comprises a layer of silicone rubber.

5. The contact heater of claim 1 wherein the second electrical ground sheet comprises an electrically conducting mesh screen.

6. The contact heater of claim 1 wherein the second electrical ground sheet comprises a sheet of electrically conducting material having a plurality of gas openings therein.

7. The contact heater of claim 1 wherein each of the plurality of layers are flexible to thereby form a flexible contact heater for securement to a surface of a fluid reservoir.

8. A temperature elevation system comprising:

a vehicle having a fluid reservoir;

an electrical heater secured to the fluid reservoir to conduct heat from the electrical heater to the fluid reservoir;

a ground member located on a free side of the electrical heating element with the ground member located on the free side of the electrical heating element having a plurality of gas passages therein to permit escape of gas therethrough while providing an electrical ground path in the event of failure of the electrical heater; and a further ground member with the further ground member and the ground member located on opposite sides of the heating element.

9. The temperature elevations system of claim 8 wherein the ground member is contained within an envelope containing the electrical heating element.

10. The temperature elevation system of claim 8 wherein the ground member comprises a mesh screen.

11. The temperature elevation system of claim 8 including a cross over connector electrically connecting the ground member to the further ground member.

12. The temperature elevation system of claim 11 wherein the heater includes a first layer of an electrically insulating layer comprising silicone on one side of the heating element and a second layer of an electrical insulation layer comprises a further layer of silicone on the opposite side of the heating element.

13. The temperature elevation system of claim 12 wherein the layer of silicone comprises a fire extinguishable silicone.

14. The temperature elevation system of claim 13 including a layer of adhesive on said heater for securing said heater to the vehicle reservoir.

15. A heater able of withstanding an overheating condition comprising:

a sealed envelope;

a heating element located in said sealed envelope;

a gas permeable electrical ground member located in the sealed envelope to provide an electrical ground and allow for passage of gas therethrough; and a second electrical ground member located on a heat conduction side of the heating element and external to the sealed envelope.

16. The heater of claim 15 wherein the second electrical ground member and the gas permeable electrical ground member form an electrical ground normal to the surfaces of the heating element.

17. The heater of claim 16 including a cross over electrical ground member electrically connecting the second electrical ground member and the gas permeable electrical ground member to each other.

18. The heater of claim 15 wherein the gas permeable electrical ground member comprises a mesh screen.

19. A method of making a contact heater comprising:

placing an electrically insulating material between a heating element and a gas permeable electrical ground member proximate a further electrical ground member;

sealing the heating element, the electrically insulating material, the further electrical ground member and the gas permeable electrical ground member in an envelope to form a sealed enclosure around the heating element, the further electrical ground member and the gas permeable ground member; and heat sealing layers of an insulating material to each other to form the sealed enclosure.

20. The method of claim 19 including the steps of:

adhering a layer of electrically conducting material to a first side of a sheet of an electrically insulating material;

etching away portions of the electrically conducting material to create a resistance heating element extending along the layer of electrically conducting material;

adhering a first electrical ground member to a second side of said electrical insulation material;

a securing the second electrical ground member having a plurality of gas passage therein to a carrier layer;

securing the first electrical ground member on one side of the heating element and securing a second electrical ground member on an opposite side of the heating element to create an electrical grounding envelope around the heating element; and securing a set of electrical power leads to the heating element and a ground wire to each of the electrical ground members to thereby provide an electrical ground path in the event of failure of the contact heater.

* * * * *